(12) United States Patent
Ozzie

(10) Patent No.: US 10,505,734 B2
(45) Date of Patent: Dec. 10, 2019

(54) PROVIDING LOW RISK EXCEPTIONAL ACCESS

(71) Applicant: Raymond Edward Ozzie, Seattle, WA (US)

(72) Inventor: Raymond Edward Ozzie, Seattle, WA (US)

( * ) Notice: Subject to any disclaimer, the term of this patent is extended or adjusted under 35 U.S.C. 154(b) by 179 days.

(21) Appl. No.: 15/436,326

(22) Filed: Feb. 17, 2017

(65) Prior Publication Data
US 2017/0272248 A1 Sep. 21, 2017

Related U.S. Application Data

(60) Provisional application No. 62/373,790, filed on Aug. 11, 2016, provisional application No. 62/310,097, filed on Mar. 18, 2016.

(51) Int. Cl.
*H04L 29/06* (2006.01)
*H04L 9/32* (2006.01)
(Continued)

(52) U.S. Cl.
CPC .......... *H04L 9/3226* (2013.01); *G06F 3/067* (2013.01); *G06F 3/0622* (2013.01); *G06F 3/0659* (2013.01); *G06F 21/60* (2013.01); *G06F 21/6209* (2013.01); *G06F 21/74* (2013.01); *G06K 19/06028* (2013.01); *G09C 5/00* (2013.01); *H04L 9/0822* (2013.01); *H04L 9/0825* (2013.01); *H04L 9/0861* (2013.01); *H04L 9/0894* (2013.01); *H04L 9/16* (2013.01); *G06F 2221/2107* (2013.01); *G06F 2221/2147* (2013.01)

(58) Field of Classification Search
CPC ............ G06F 21/60; G06F 2221/2107; G06F 2221/2147; G06F 3/0622; G06F 3/067; G06F 3/0659; G06F 21/74; H04L 9/16; H04L 9/0894; H04L 9/0861; H04L 9/3226; H04L 9/0822; H04L 9/0825; G06K 19/06028; G09C 5/00
See application file for complete search history.

(56) References Cited

U.S. PATENT DOCUMENTS 9,984,255 B2 * 5/2018 Shah ...................... G06F 21/64
2003/0021413 A1 1/2003 Kiiveri et al.
(Continued)

OTHER PUBLICATIONS

The International Search Report, PCT/US2017/018439, dated Jun. 22, 2017.
(Continued)

*Primary Examiner* — Tri M Tran
(74) *Attorney, Agent, or Firm* — Steptoe & Johnson LLP; Robert Greenfeld

(57) ABSTRACT

A method and system for providing unencrypted access to encrypted data that may be stored on a device, sent as a message, or sent as a real-time communications stream. The method may include using public key cryptography to securely enable accessing the encrypted data stored on a device or communicated by a device. For instance, the method may include using a device vendor's public key to securely enable that vendor to enable only authorized parties to themselves decrypt previously-encrypted device storage, messages, or real-time communications streams.

20 Claims, 8 Drawing Sheets

(51) Int. Cl.

| | | |
|---|---|---|
| G09C 5/00 | (2006.01) | |
| H04L 9/08 | (2006.01) | |
| G06F 21/60 | (2013.01) | |
| G06F 21/62 | (2013.01) | |
| G06F 21/74 | (2013.01) | |
| G06F 3/06 | (2006.01) | |
| G06K 19/06 | (2006.01) | |
| H04L 9/16 | (2006.01) | |

(56) References Cited

U.S. PATENT DOCUMENTS

| | | |
|---|---|---|
| 2003/0066091 A1 | 4/2003 | Lord et al. |
| 2004/0010411 A1* | 1/2004 | Lewis ............... G06F 21/10 704/270.1 |
| 2004/0109569 A1 | 6/2004 | Ellison et al. |
| 2005/0013440 A1 | 1/2005 | Akiyama et al. |
| 2007/0028090 A1* | 2/2007 | Lopez ............... H04L 63/0428 713/153 |
| 2007/0239605 A1 | 10/2007 | Munguia et al. |
| 2010/0211787 A1 | 8/2010 | Bukshpun et al. |
| 2011/0154023 A1 | 6/2011 | Smith et al. |
| 2012/0124388 A1 | 5/2012 | Chng et al. |
| 2013/0003976 A1 | 1/2013 | An et al. |
| 2013/0103939 A1 | 4/2013 | Radpour |
| 2014/0342726 A1 | 11/2014 | Smereka et al. |
| 2015/0006896 A1 | 1/2015 | Franck |
| 2015/0032633 A1 | 1/2015 | Haider et al. |
| 2016/0065374 A1 | 3/2016 | Sauerwald et al. |
| 2016/0065540 A1 | 3/2016 | Androulaki et al. |
| 2016/0357981 A1 | 12/2016 | Tzeng et al. |
| 2017/0006003 A1* | 1/2017 | Zakaria ............... H04L 63/061 |

OTHER PUBLICATIONS

The International Preliminary Report on Patentability, PCT/US2017/018439, dated Sep. 18, 2018.
The European Search Opinion, EP 17767141.9, dated Jul. 11, 2019.
The European Search Report, EP 17767141.9, dated Jul. 11, 2019.
The International Search Report, PCT/US18/20253, dated Jul. 9, 2018.
Written Opinion of the International Searching Authority, PCTUS18/20253, dated Jul. 9, 2018.
The Non-Final Office Action, U.S. Appl. No. 16/210,899, dated Jul. 29, 2019.

* cited by examiner

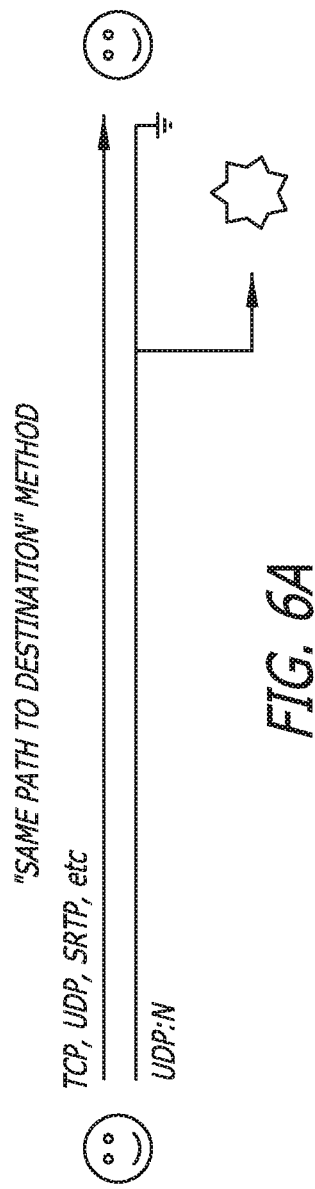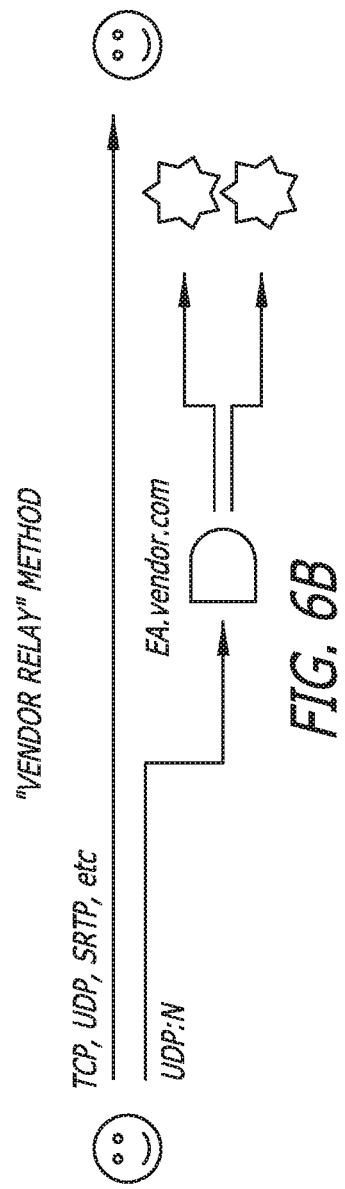

PROVIDING LOW RISK EXCEPTIONAL ACCESS

CROSS-REFERENCE TO RELATED APPLICATIONS

This application claims the benefit of U.S. Provisional Application No. 62/310,097, filed Mar. 18, 2016, which is entitled "Providing Low Risk Exceptional Access to a Mobile Device" which is herein incorporated by reference in its entirety. This application further claims the benefit of U.S. Provisional Application No. 62/373,790, filed Aug. 11, 2016, which is entitled "Providing Low Risk Exceptional Access to Real-time Communications" which is herein incorporated by reference in its entirety.

BACKGROUND

Vendors of phones, tablets, and other mobile computing and communications devices have been increasingly utilizing strong cryptography and cryptographic key management to secure access to the information stored within those devices. At the same time, governments have become concerned about their lack of technical means, in the course of pursuing legally-authorized investigations, to obtain access to the contents of seized devices. Some have argued for the need to create "golden keys" that could be used by the government to unlock access to such devices on an exceptional basis in legally authorized circumstances. Encryption keys or methods that would provide immediate access or perhaps would yield a differential work factor in trying to access device contents. Others have argued that even with good intent, the creation of such things introduces far too much risk for unintended use or abuse, thus weakening security for those of the majority who are not targets of legally authorized government access.

In general, mobile devices including cell phones, tablets, and other modern computing devices have a secure area within which security critical code and cryptographic data are stored and maintained. Although sometimes implemented in software alone, such a security is now commonly implemented by using a hardware security module, which is referred to as a "secure enclave" herein.

It is common practice for device providers to leverage the capabilities of the secure enclave to lock and prevent access to a given device by using "data protection keys," which are cryptographic keys used directly or indirectly by the system software and firmware of the device to ensure the confidentiality of data contained within the non-volatile storage of the device.

One way of generating or protecting such a data protection key is to use a secret "passcode key" to prevent unauthorized access. Such a passcode key might be generated by starting with a user supplied password or PIN, which is then tangled with a secret device-unique encryption key by running both through a password-based key derivation function such as PBKDF2-AES. This passcode key may be used directly as a data protection key, or may provide indirect protection of the data protection key through "key wrapping" using one encryption key to conceal another.

It also is common practice for device providers to leverage the capability of the secure enclave to lock and protect access to a given device by recognizing one or more human fingerprints, scanned by touch sensors, allowing an authorized user to unlock the device as an alternative to entering their password or PIN. These fingerprint sensors, working securely and cooperatively with the secure enclave, then generally use mechanisms such as key wrapping to deliver the ability, for example, one per scanned fingerprint, by which the system software can gain access to the data protection keys. Thus, it is common practice, in existing devices supporting user-supplied passwords or PINS as well as fingerprints, to use key wrapping to provide a number of ways to unlock data protection keys and to provide the ability to unlock a device.

In addition, device vendors verify the authenticity and protect the integrity of system software and firmware of their devices to prevent unauthorized access and modification by malware. This lock-down is generally accomplished by a technique called code signing, wherein cryptographic mechanisms including public key cryptography are used to attach digital signatures to vendor authorized packages of code and other digital resources. A chain of trust is established by using digital signature verification using a vendor's root certificate authority (CA) public key and/or other vendor public keys generally contained in the read-only memory of the device, or which may be securely stored within a secure enclave.

A vendor creating, maintaining, and using vendor keys must do so with great care, for carelessness that might for example cause disclosure of a private key, misuse of the private key, or substitution of an unauthentic public key would cause a fundamental breakdown of trust. So critical is this trust that vendor private keys are generally stored and maintained exclusively within one or more enterprise-grade hardware security modules (HSMs) at their facilities. Vendors generally maintain strict internal processes and practices so that only their trusted developers and trusted software release engineers are authorized to attach digital signatures to software, firmware, and other digital resources, thus ensuring the integrity and provenance of all digital assets signed, encrypted, and decrypted with the vendor keys.

Previous methods for providing government agencies with access involve a key escrow method where decryption keys are used. Key escrow, however, is widely viewed as a high-risk solution for vendors and their customers because the standards vary, it subjects key holders to potential coercion, and motivations of key holders can change over time. Vendors must bear the business risk, market risk, and reputation risk of properly handling their vendor keys. The vendors must do this for cybersecurity reasons, so that they can securely deliver updates to their customers' devices.

What is needed is a method or system that allows a vendor to use its vendor keys to provide low risk access to government agencies and the like to locked devices, real-time communications, and secure messaging.

SUMMARY

Briefly, and in general terms, various embodiments are directed to a method and system for providing access to encrypted data stored on a communication device. The method may include encrypting a device's data protection key to generate a data access key, and storing the data access key within memory of the mobile device. The data access key may be reformatted into a transportable format, such as a barcode, which may then be sent to a vendor of the mobile device. The data access key may be decrypted by the vendor. The method also includes receiving a data protection key from the vendor in a transportable format. The data protection key may then be used to unlock the mobile device.

Also, various embodiments are directed to a method for providing access to a real-time communication. The method may include recording an encrypted communication sent from a communication device and recording an encrypted master secret and a vendor-encrypted timed key table sent from the communication device. Further, the method may include receiving at least a portion of an unencrypted timed key table after a vendor decrypts the encrypted timed key table, and decrypting the encrypted master secret using the at least a portion of the unencrypted timed key table to obtain a master secret. The recorded encrypted communication may then be decrypted using the master secret.

In yet another embodiment, a method is disclosed for providing access to secure messaging communications. In this embodiment, the method may include recording encrypted messaging communications sent from a communication device and recording a distribution packet including a vendor-encrypted timed key table sent from the communication device. A subset of an unencrypted timed key table is then received after a vendor decrypts the encrypted timed key table, and the distribution packet is decrypted using the subset of the unencrypted timed key table to generate a message key. The method includes decrypting the recorded encrypted messaging communications using the message key.

Other features and advantages will become apparent from the following detailed description, taken in conjunction with the accompanying drawings, which illustrate by way of example, the features of the various embodiments.

BRIEF DESCRIPTION OF THE DRAWING

FIG. 6A depicts a same path to destination method for transmissions of an exceptional access package.

FIG. 6B depicts a vendor relay method for transmissions of an exceptional access package.

DETAILED DESCRIPTION

Figure 1:
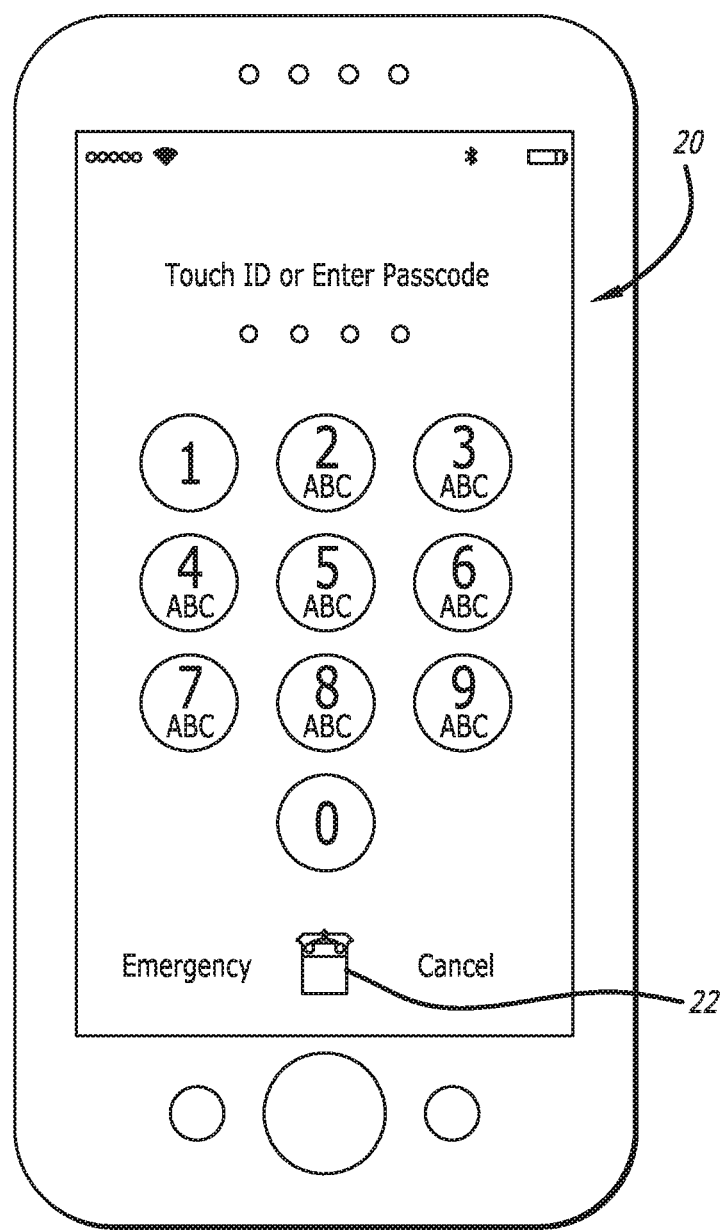
FIG. 1 depicts an exemplary screenshot of an unlock screen on a mobile device, such as a cell phone.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

Accessing a Device

In one embodiment, a method for providing low risk access to a communication device includes using key wrapping to securely add another layer to unlock the device and gain access to the data protection keys of the device. The communication device may be a mobile device or any other computing device used to send or receive communications or data. In use, the exemplary embodiment allows the mobile device vendor to unlock a specific device without introducing material vulnerabilities related to key generation or key management beyond those already existing in the vendor designs. In certain embodiments, the vendor's cooperation may be needed to unlock a specific device. In one embodiment, only a government agency will be allowed by the vendor to request that a specific device be unlocked. However, it has been contemplated that the owner of the mobile device, their heirs, or any other entity may be allowed by the vendor to seek the unlocking of specific devices.

The described embodiments of the method for gaining access to a communication device addresses the challenges of a vendor providing access to its devices by delivering a mechanism for delivering secure stored data on an exceptional basis in specific ways. In one way the methods address certain challenges by fitting within existing processes and practices within which government agencies issue formal requests to vendors for assistance, and vendors have the opportunity to challenge such requests. Furthermore, the methods are practical and it would be economically and logistically reasonable for a vendor to implement these methods into practice. The methods are strongly bound to a single device of a suspect, making it unfruitful to request keys for devices not in lawful possession of the government agency.

In addition, the methods for providing or gaining access to a communication device do not require devices to be in the possession of the vendor for an unlock operation. The methods do not necessitate a complex network protocol for key transfers or device decryption, and the methods do not necessitate key escrow or government-supplied keys. Furthermore, the methods described herein block surreptitious or transient use (i.e. at borders, for surveillance), because the methods require vendor cooperation and the devices are rendered useless after having been unlocked in certain embodiments. Implementing these methods and embodiments increases protections for the suspect of an investigation by making the procedure to unlock a device far more forensically-sound.

The current method includes a function for generating a data access key. At any convenient point after the device has been successfully unlocked and thus when the data protection key is available to the operating system software, key wrapping may be used to generate the data access key. The device's data protection key is encrypted by the operating system using a vendor's public key, resulting in the data access key for this specific device. This step only needs be done once or at most once each time the data protection key might change.

Depending upon the number of levels of redundancy or nesting desired by the vendor, there are a number of methods that might be used to generate the data access key. One embodiment of the method is to use a vendor public key, for example, one of the vendor's existing "code signing" public keys, to securely wrap and encrypt the data protection key, resulting in the data access key. An alternative method might be for the secure enclave of the device to use a device-specific unique secret encryption key ("UID") to first wrap the data protection key, and subsequently as above use a vendor public key to further wrap and encrypt the data protection key to create the data access key.

In one embodiment, the resulting data access key may be stored within the non-volatile storage of the device in a place that cannot be modified by user applications, in an unencrypted area that will be available to the operating system software when the device is later locked.

The method for providing low risk access to a mobile device may also include a function for formatting the data access key in a way that may be most easily usable by the entity requesting exceptional access to a device, which may be a government agency. There are multiple embodiments of this formatting of the data access key, such as a visual two-dimensional bar code image, a readable text string, a listenable audio file, or the like.

For operations such as code-signing, vendors generally maintain vendor private keys such as those used for code signing in a highly-secure manner within an enterprise-grade hardware security module (HSM). Vendors also have well established practices that permit only their trusted personnel, operating in the context of strictly-defined processes and practices, to perform cryptographic operations that might rely upon that vendor's private keys.

In one embodiment, the function being described herein similarly relies upon the vendor's trusted personnel, and trusted internal processes, to decrypt the data access key that may be submitted to them. Analogous to its code-signing processes and practices, and in some embodiments using the same key, this operation necessitates the vendor's use of a private key that may well be contained within their enterprise-grade HSM, and thus this function may be implemented directly within the HSM.

The method for providing low risk access to a mobile device also includes a process affording the vendor the exclusive capability to decrypt the data access key to gain access to that device's data protection key. This process uses the data access key data extracted from a specific target device. If that data had been formatted as an image or text or audio in a given embodiment, that formatting is first removed. The vendor's trusted personnel then securely utilize their enterprise-grade HSM to decrypt this data access key, resulting in the data protection key data. Only if that data was encrypted with a true and valid vendor public key will the HSM be capable of decrypting this data access key using the vendor's private key contained within. The resulting decrypted data, the data protection key, may then be formatted in a way that may be most easily usable by the requesting entity, such as a government agency. The format of the data protection key may be a visual two-dimensional bar code image, a readable text string, a listenable audio file, or the like, which is then conveyed to the government agency.

Once received by the government agency, the data protection key is then conveyed to the locked device's operating system software, by entering it into the locked mobile device. In one embodiment this may be performed by the operating system utilizing the device's built-in camera to take a photograph of a visual two-dimensional bar code image. In other embodiments it may prompt for a text string, listen for an audio file, or the like.

With access to the data protection key, the specific mobile device's operating system software has the cryptographically-validated evidence that it is indeed a vendor-authorized unlock request. For all practical purposes, with access to the device's storage granted by use of the data protection key, the device is unlocked. The system software will proceed as such, and can save a record of this fact within its non-volatile memory so that the device can be restarted in an unlocked state any time thereafter. In other embodiments, a new password or PIN may be required in order to unlock the device upon subsequent restarts.

A preservation step also may be included in the present method. In one embodiment, upon a successful unlock, it may be in all parties interests that forensically the device be preserved as closely as possible to the state that it was in at the moment of unlock. Furthermore, it may be important that the device no longer have access to send or receive data from any network, as operations performed in the foreground or background on the device could delete or modify data in a way that could forensically compromise the state of system and application data both on the device and in the cloud. In one embodiment, it is preferred to have certainty about the fact that the data and metadata on a device and in the cloud are a direct result of the subject's prior actions, versus the reasonable doubt introduced by things that might occur (even with no ill intent) as a result of actions taken or signals received by the device after the unlock operation.

Toward addressing this problem, upon successful verification of the unlock request, the operating system software may save, in its own secure non-volatile memory, an indication that it will be functioning to preserve and isolate the state of the device and its cloud-based data to indicate a "forensically secure" mode.

In one embodiment, when in the forensically secure mode, a snapshot of the internal clocks and timers of the device may be taken at the very moment the unlock device operation had been performed. From that moment on, each time the device restarts, these clocks and timers may be securely restored with the contents of those snapshots. This will have the effect of ensuring that time-dependent software behaviors will at a minimum be repeatable after any device restart while in a forensically secure mode.

When in the forensically secure mode in one embodiment, the device's radios including its GPS may be permanently disabled, with the operating system and applications thereafter behaving as if the device were in "airplane mode." Thus, in this mode, the device will not communicate on a network and thus will not be able to affect the state of anything outside of the device itself, nor will anything that happens on the network be able to destroy or otherwise affect the state of anything on the device. It has been contemplated that the device may be allowed to connect with a closed or secured network. In other embodiments, the device may be allowed to connect to any network.

Furthermore, in the forensically secure mode, the storage system within the operating system may operate in such a manner that any "modify" operations, e.g., "delete," requested of the device's storage will be prevented. At the same time, the application or system software performing those "modify" operations may have the illusion that they actually succeeded in one embodiment. In one embodiment, the operating system may use its own volatile memory to act as a "shadow" that maintains changes that otherwise would have been written to storage. In another embodiment, the operating system may use its own reserved storage space or unallocated file system free space as the "shadow." As a result, when a device is in the forensically secure mode, upon each restart its state will be restored to what it was at the moment the device was unlocked.

Figure 2:
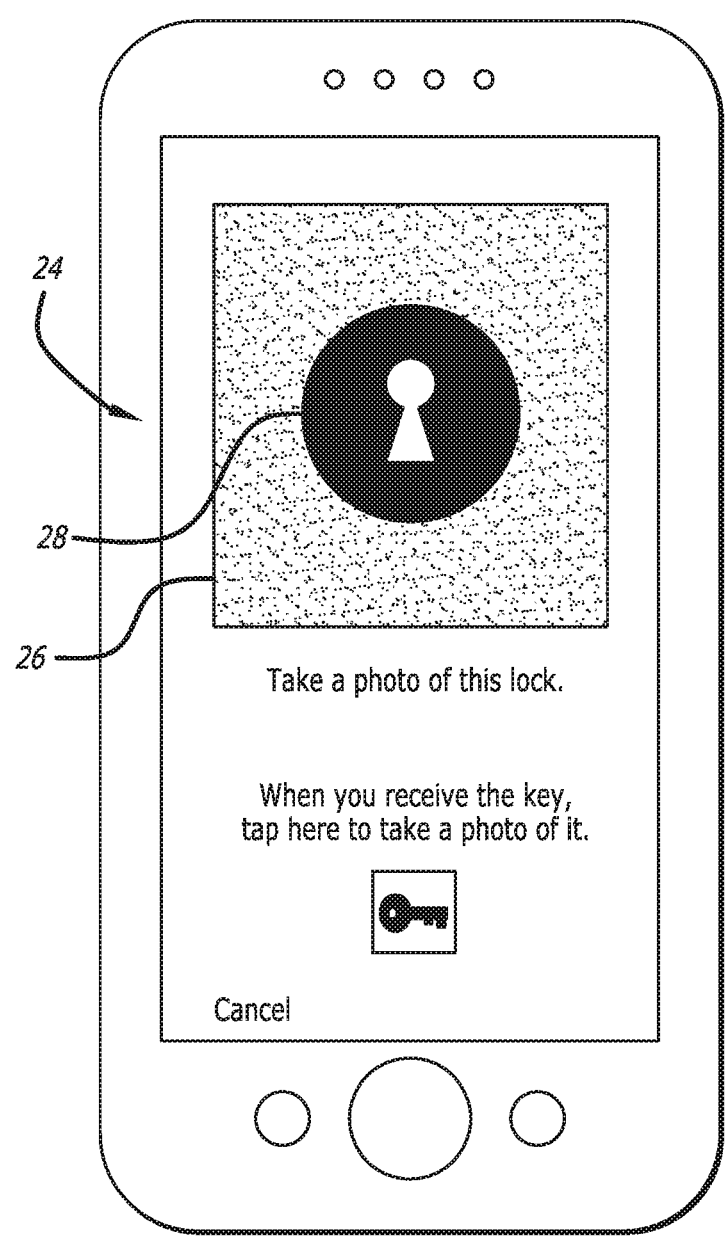
FIG. 2 depicts an exemplary screenshot of a special device unlock screen on a mobile device.

By way of example, and not by way of limitation, an operation of the method will now be described with reference to the figures. In this example, a government agency, or any other third party, would be in legal possession of a phone, tablet, or other computing device, and would like to investigate the contents stored on the device. FIG. 1 shows an unlock screen 20 of a mobile device. There is a new tap region 22 on the lock screen 20. The new tap region 22 may be located anywhere on the unlock screen or may be located on a separate page or feature of the unlock screen that may be accessed swiping in a certain direction or activating hardware buttons located on the device. By tapping on the new tap region 22 on a device in their possession, the government may gain access to a special device unlock screen 24 as shown in FIG. 2. The image in FIG. 2 is for illustrative purposes only, and there are several well-designed methods of getting to such an unlock function, such as tapping, doing single-touch or multi-touch gestures on known areas of the screen, entering a known passcode or passphrase, holding down multiple letters or numbers simultaneously in a specific manner, holding down buttons for specific lengths of time, playing certain audio tones heard by the device, inserting special hardware accessories, doing special actions with the phone or its physical buttons on reboot, and the like.

In the example shown in FIG. 2, a barcode 26 is generated by a processor of the device that is a visual form of a data access key represented as a two-dimensional bar code 26. It should be understood that any text, image, code, sound, or the like could be used in place of or in addition to the barcode.

Government agencies may then use a separate camera, or may use the camera function on their own devices, to take a photograph of this screen, including the barcode 26. The agency may then include this photograph as an integral part of standard forms issued to the vendor of the specific device to request access to the contents of the device. Receiving the request as a part of its normal processes and practices, the vendor or its attorneys will generally use due care to scrutinize the request for its validity, provenance, jurisdiction, and other factors. Once the vendor concludes that it will take action on the received request, the vendor may use secure processes and practices analogous to its existing "code signing" to decrypt the data access key that was received from the government agency. In an embodiment where the data access key was conveyed as a photograph of a two-dimensional barcode image, that image will be processed such that the result will be the binary form of the data access key. The data access key will then be submitted by the vendor to its enterprise HSM for decryption. Assuming that this was a valid data access key, the result will be a data protection key for a specific device. The vendor will then convey this data protection key back to the government agency as an integral part of their formal response to the request. In one embodiment, the vendor will again format the data protection key as a two-dimensional barcode image. Other embodiments may format it in other ways described earlier.

Figure 3:
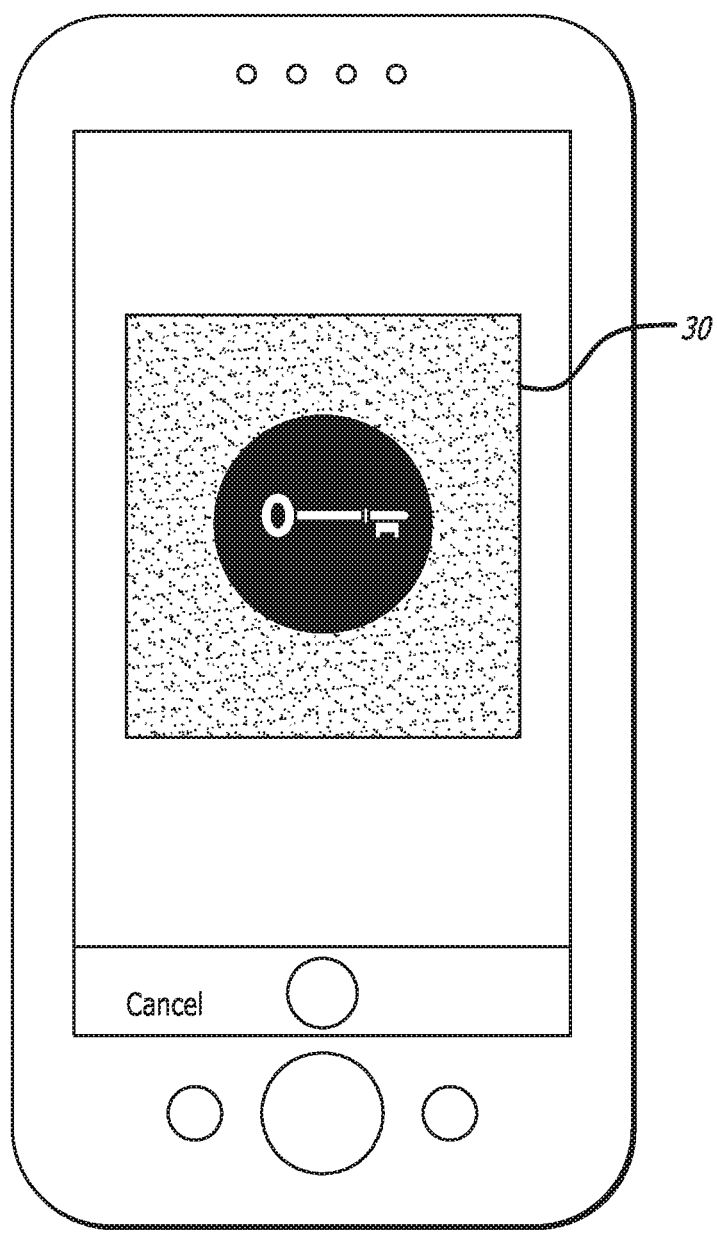
FIG. 3 depicts an exemplary screenshot of an unlock screen on a mobile device in the process of capturing an image of a data protection key.

Upon receiving the v response from the vendor, the government agency fetches the specific device and places it into a state wherein the agency can enter the data protection key back into the device. In one embodiment, access to this function will be provided on the same special device unlock screen 24 as shown in FIG. 2, where a government representative would then tap the key icon 28 on the screen. In this embodiment, this step brings up the built-in camera of the device, enabling the government agent to capture the data protection key image 30 as shown in FIG. 3.

Figure 4:
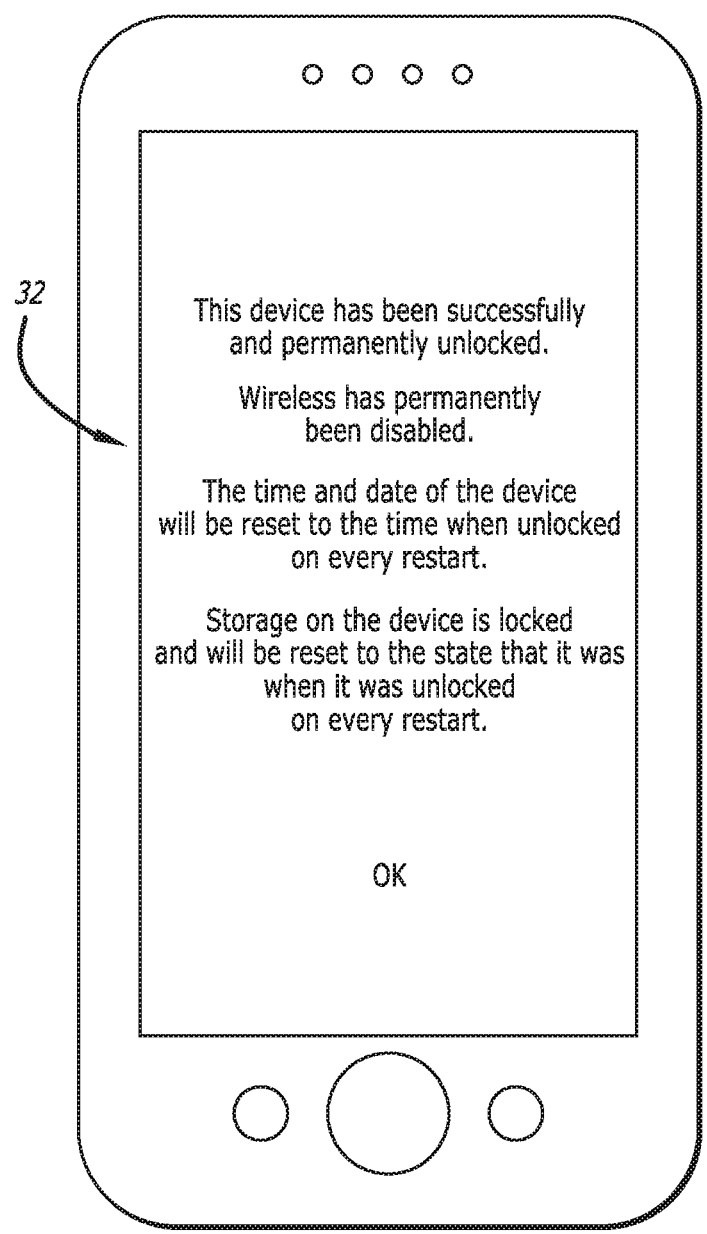
FIG. 4 depicts an exemplary screenshot of an entry screen after successfully capturing that image and unlocking a mobile device.

Immediately upon capture of the image 30 of the data protection key, the processor of the specific device performs the unlock device function and, in some embodiments, it also may place that device into a forensically-secure mode. If the decoded key is not valid for any reason, the device will not accept it, and the device will fail to unlock. If, however, the decoded key is valid and the device was successfully unlocked, a confirmation screen 32 may be displayed on the specific device. One example of an entry screen 32 is depicted in FIG. 4. Any information may be displayed on the entry screen 32. As shown in FIG. 4, the entry screen may inform the government agent that the device has been successfully unlocked, that wireless capability has been disabled, that the time and date of the device will be reset to the time when unlocked on every restart, and that storage on the device is locked and will be reset to the state when it was unlocked on every restart. In some implementations, additional information displayed on the entry screen 32 may include the date and time of such authorized unlocking, or additional metadata optionally included by the vendor along with the data protection key.

Figure 5:
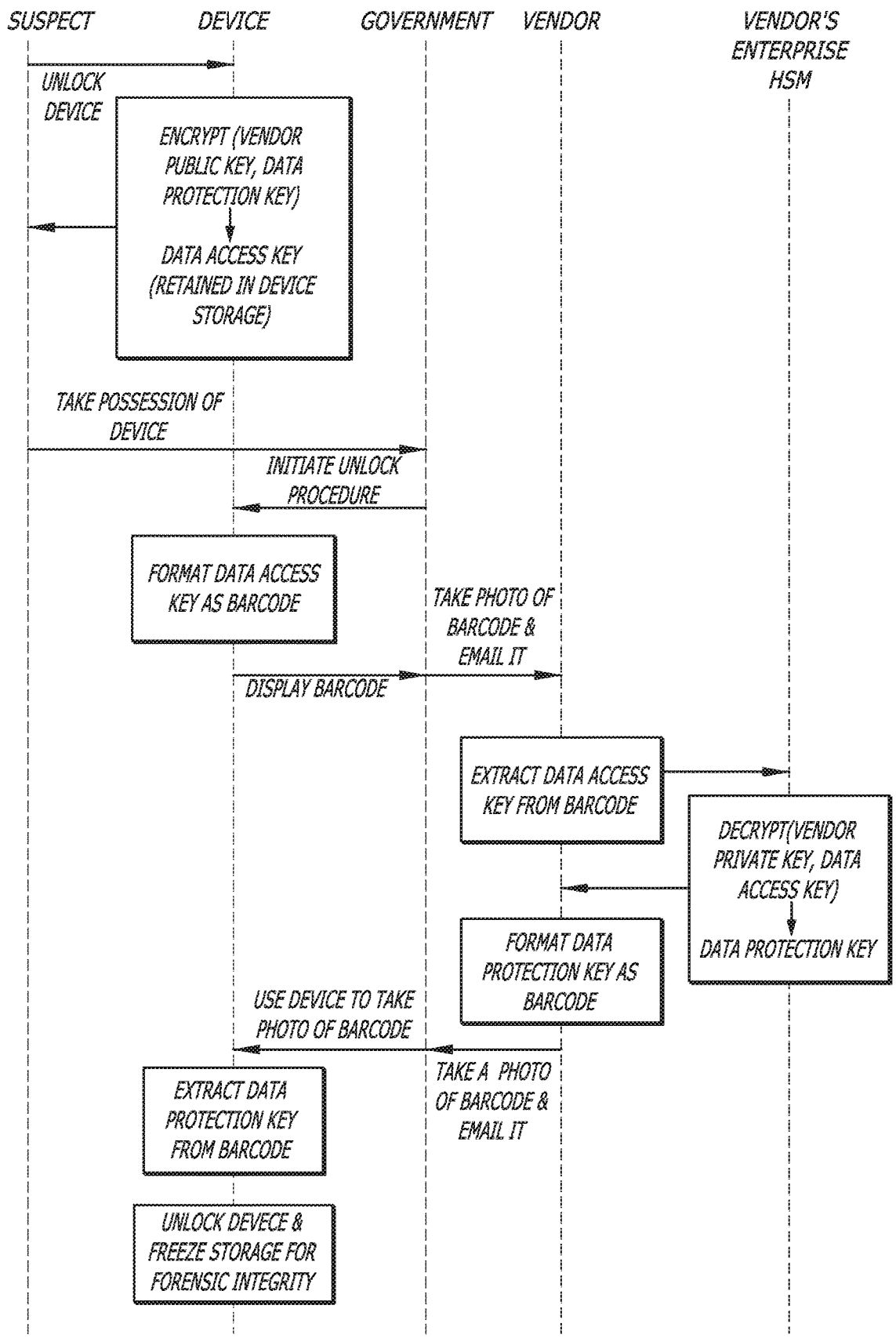
FIG. 5 depicts a diagram of an exemplary method for gaining access to a secured device.

FIG. 5 depicts a diagram of the steps needed to perform the method for providing access to a suspect's cell phone, according to one embodiment. As shown in FIG. 5, the suspect is able to unlock and use his device with a data access key that is retained in device storage. Once the government agency takes possession of the suspect's phone, the agency will initiate the unlock procedure by accessing the device unlock screen 24 (FIG. 2), which may display an image such as a barcode 26. The government agency will then take a picture of the barcode 26 and email or otherwise transmit the picture to the vendor of the suspect's cell phone. If accepted by the vendor, the vendor may then extract data from the barcode 26 and decrypt the data access key using the vendor's enterprise HSM, containing the vendor's private key, to decrypt a data protection key for that device. The data protection key may be formatted as a barcode and emailed or otherwise transmitted to the requesting government agency. The government agency can then use the suspect's cell phone to take a picture of the data protection key barcode, and the cell phone processor will extract the data from the barcode and unlock the cell phone. The cell phone processor may also freeze the storage on the device for forensic integrity. As should be understood, any third party may use this method in order to unlock any device, such as a cell phone, tablet, laptop, or other device capable of communication.

Access to Real Time Communications

In another embodiment, a method and system are used to provide access to real-time communications of a device. The methods and systems of this embodiment provide a form of exceptional access for real-time and recorded communications. By way of background, it is within the scope of a government's capabilities to perform legally authorized wiretaps and warrants in order to record digital communications, either messages or streams. This embodiment provides a method by which device makers or vendors, and in some cases communications application developers, might enable access to any type of recorded communications. In some circumstances, the access may only be enabled within a very narrow and controlled set of circumstances to prevent abuse.

Certain embodiments of the method and system for providing access to real-time communications of a device in a safe and controlled manner fits within existing processes and practices within which governments issue formal requests to vendors for assistance, and vendors have the opportunity to challenge such requests. Also, these embodiments may not require burdensome involvement of a vendor for each and every legally authorized communication that is collected, beyond involvement that is necessary for the government to initially demonstrate legal authorization to access such communications. Furthermore, the embodiment may be low-risk in practice because it leverages strong cryptography and widely-deployed encryption and key management mechanisms vendors are already using to protect the confidentiality of storage and communications on their devices. In addition, the embodiment may be cryptographically bound to a specific end point and a limited window of time, ensuring that it cannot be inappropriately extended into use for general warrantless real-time surveillance.

It may be practical and is a low-burden method from an engineering perspective for vendors and application developers alike, and in a specific set of cases may not even require applications to be modified at all. The method may be low-risk from an industry perspective because some embodiments may be implemented without changes to existing widely-deployed cryptography and secure communications protocols. Also, the embodiment may not necessitate new, fragile, complex network protocols for key transfers, and it may not necessitate any new form of key escrow or government-supplied keys. It is important to note that the embodiments may be usable in the context of both commercial and governmental exceptional access scenarios. Furthermore, because of its cryptographic verifiability, the method of one embodiment increases protections for the subject of an investigation by ensuring that the chain of evidence for any recorded communication cannot be forged.

Secure real-time communications protocols are commonly structured into two distinct phases. In the first phase the communicating entities are authenticated, in which both parties agree upon the algorithm, parameters, and key by which the main body of the communications will be encrypted (the "master secret" protecting such communications). In the second phase, the actual encrypted communications takes place, protected by the encryption algorithm and the master secret. Although the specifics of secure real-time communications protocols may vary considerably among different communications products, it is generally true that one who is reasonably well versed in software engineering has knowledge of which encryption algorithms are used in a given communications session, and is in possession of the master secret key, that they will be able to decrypt the main body of that communications stream.

According to one embodiment, a mainstream device vendor might instrument its device OS, or a mainstream app vendor might instrument its communication app, to facilitate access to the master secret protecting the body of communications between endpoints recorded in the context of a time-bounded legally authorized allowance for exceptional access to a subject's communications.

Although the entity who is collecting and requesting access to such decryption information is referred to herein as "government", it may be any such entity who is permitted by law to do so such as a government affiliate or a regulated commercial enterprise required to record communications occurring on its employees' mobile devices.

There are certain key generation and maintenance policies described herein as a minimization policy. In some embodiments, the minimization policy may be defined by a device vendor, in some embodiments these policies might be dictated by an enterprise customer, and in some embodiments these policies may be a combination of both.

When referring to a developer, the app or application may be a software application or operating system, and the developer may be the vendor themselves. The reverse is also true: this method may be used by an app developer independently of a device or its operating system; in this case the developer assumes the role of the vendor prepared to interact with the government, or other third party, to evaluate and process exceptional access requests.

The present embodiments incorporate a method, using a minimization policy, to restrict and minimize access to a time-bounded window that is consistent with the authorization for such an access request. The data structure enabling this capability is referred to as the timed key table ("TKT").

In this method, one or more instances of a TKT are maintained persistently in non-volatile storage for communications conducted on a device, for or by any given application on a device. The purpose of this data structure is to provide the capability, given a specific range of calendar dates, to gain access to the minimal set of keys permitting one to decrypt information within that range of dates. An example of the minimization data structure, which is persistent in non-volatile storage and may be determined by the vendor's minimization policy, is shown below in Table 1:

TABLE 1

Timed Key Table

| Range | Key |
| --- | --- |
| 2017 Week 48 | 23901382302309423 |
| 2017 Week 49 | 83098423049823413 |
| 2017 Week 50 | 08234809234982444 |
| 2017 Week 51 | 23048234298342329 |
| 2017 Week 52 | 09809832423049204 |
| 2018 Week 00 | 82290823423458344 |
| 2018 Week 01 | 92340972348010502 |
| 2018 Week 02 | 03982342293842394 |
| 2018 Week 03 | 72902938402384222 |

In the example of Table 1, week 48 may be the current week and the weeks that follow may be future weeks. For each entry in Table 1, there may be a symmetric encryption key, generated from numeric randomness available on the device. Also, there may be an absolute calendar date range describing the period during which that encryption key is intended to be used. In this embodiment, the purpose of any given encryption key in any given row of the TKT is to key wrap the master secret of communications sessions that may occur within the time range specified in that same row. For communications occurring outside the date range of a given row, the corresponding key is not used. In certain embodiments, ranges may overlap among entries and may be non-uniform, allowing for flexibility in starting date for assigning keys. Range lengths define the granularity of duration.

In one embodiment, with any given TKT, and a legally-authorized range of dates, the table may be filtered to determine which subset of keys might validly be used to decrypt master secrets within that period. If a given range of starting-ending dates are not covered by the ranges specified in the TKT, no keys would be returned. The functional description of such a filtering function might be:

Filter(TKT, Start,Duration)→TKTSubset

In one embodiment, a TKT is needed at the point that a secure communications session has just been established, its initiation ("Initiation"). In such an embodiment, the following may functionally describe the algorithm for an App.TransmitEAPackage( ) function that may be used to generate a TKT, where "App" is intended to represent software within a communications application, or software within an operating system acting on behalf of such an application. This is a general functional description, while details will follow below.

App.Maintain(TKT, Minimization Policy)
    App.Encrypt(TKT, Vendor Public Key)→EA Request Pkg
    App.GetCurrentKeyInfo( )→Current Range, Current Key
    App.Encrypt(Master Secret, Current Key)→Encrypted Master Secret
        Or, if Master Secret not supplied, NIL→Encrypted Master Secret
    App.Marshal(Current Range, Encrypted Master Secret)→ EA Decryption Pkg
    App.Marshal(EA Request Pkg, EA Decryption Pkg)→EA Distribution Pkg
    App.Transmit(EA Distribution Pkg)

In one embodiment of the method, at Initiation the vendor's software (generally the device's OS) will create or update a TKT whose keys will then be used to encrypt and thus key wrap an optionally-supplied master secret. The number of table entries in the TKT, as well as the starting dates and durations of the ranges in those entries will be chosen to reflect a minimization policy. This policy may be based on factors such as the frequency and burden of government/vendor interaction in order to serve warrants, and also based on factors such as network packet size or memory size given that this table will be both transmitted over the network and saved in non-volatile memory of the device.

In one embodiment, the TKT is maintained with the following method. When a TKT table is created and as it is maintained, its ranges are updated according to the minimization policy. If, for example, Initiation occurred at calendar date/time T, entries in the TKT with date/times prior to T would be deleted from the table. Then, if the minimization policy dictated that the table needed to be lengthened, new rows in the TKT would be appended to the table, with each new row having a new randomly-generated encryption key. The new entries would be generated by using a secure key generation procedure that according to one embodiment utilizes the best symmetric key generation and the best randomness available on the device.

Also in one embodiment, after updating a TKT the software may optionally log the updated TKT externally to the device. In certain highly controlled and highly-regulated environments, such as the case in which devices are owned and managed by regulated commercial enterprises doing business that requires exceptional access by the enterprise itself, the enterprise may need to have a continuous record metadata that can potentially be used to decrypt the contents of secure communications occurring using its devices. In this example, the updated TKT would be securely logged over the network to an enterprise archive explicitly designed for this purpose, coupled with information identifying the device.

Since TKT policies may dictate that date ranges are in units of weeks or months, the TKT update procedure and thus, new key generation and potential enterprise logging, may only need to occur on a relatively infrequent basis.

When maintaining that TKT at Initiation time T, it is necessary for the software to understand the current date and time as in T above. In determining T, the software (generally the OS) may use efforts to prevent T from being incorrectly set by the device user. Rather than using a time T that can be modified by a user, a given embodiment of the software may use one or a combination of available sources of date/time such as internal battery powered real time clock, GPS/GLONASS time, internet-based time server reports, telecom carrier-reported time.

In some implementations, a single TKT generated by an OS vendor might be securely maintained within operating system storage, in which case that same TKT may be used for all applications on that device. In another implementation, the vendor's OS may securely maintain a TKT on a per-application basis within a per-application system storage. In yet another implementation, a given communications application itself may maintain its own TKT.

Tracing the exceptional access process from end to end in one embodiment shows a number of distinct steps in the method for legally-authorized exceptional access. As described below in more detail, at the point of communications Initiation, the method may include a step for obtaining a master secret, which is programmatically identified by the vendor or application developer that may plausibly be used by the government agency to decrypt a useful portion of a recorded communications. Also included in the method is a step for the access enablement process where an operating system or application code prepares and transmits data enabling a future legally-authorized exceptional access request to be fulfilled. This step involves packaging an up-to-date TKT into an encrypted form only decipherable by the Vendor. This step may also involve encrypting a master secret with the most current entry in the TKT. Further, this step may involve placing the encrypted master secret and the encrypted TKT into an exceptional access distribution package. The method may also include a step for transmitting the exceptional access distribution package in a way such that the government is likely to record it while also recording the contents of the Initiated communications. In order to provide exceptional access when authorized by legally-authorized warrant, the government may then work with the vendor to obtain a filtered and minimized portion of the TKT. By using this TKT, the government can then decrypt a range of exceptional access distribution packages, whether recorded or in real-time, thus gaining access to master secrets for communications that occur during a given period authorized by the warrant.

Obtaining a Master Secret

Modern communications commonly take a number of forms. When encrypting messages, such as emails or documents, which are standalone units of communications, there is generally a clear text portion of the message called an envelope, which includes routing information and an encrypted portion that contains the body of the communications. It is generally straightforward to add new fields to a message's envelope. Another type of message is streams, such as those used by VoIP or text/photo messaging applications, either peer-to-peer or device-to-server, which are sessions that potentially contain many units of communications among multiple parties. When streams are encrypted, there is generally only a very small clear text portion that is present at the start of a session, while the vast majority of the data is encrypted for its duration. Because secure sessions are now commonly based on open standards-based protocols, it is not as straightforward to add new fields to the analogous clear text envelope at session establishment.

In any of these forms of communications, though, the protection of the body of the communication generally boils down to concealing a package of cryptographic data that, if possessed by either party engaged in such communications, could be used to later decrypt much or all of that body.

For practical reasons, many communications tools will ultimately protect the body with a small package of metadata generally consisting of an algorithm description, a symmetric cipher key, and an initialization vector. This encrypted cryptographic package (regardless, for example, of whether it is concealed in the header of a message, or is concealed in the protocol header at the start of a stream) is herein referred to as the master key or master secret for that communications.

In one embodiment, for a session-less secure messaging system, such as email or text messaging, a master key or master secret is known just at or after the point when a secure message's body has been encrypted, but before it has been sent. This secret is likely to involve a key that is valid just for this message.

For secure communication streams such as those involving standards such as SSL/TLS or SRTP, such a master key or master secret is determined by protocols wherein the endpoints ultimately agree upon such a secret in real-time, a secret that is valid for the duration of this session or until a new master secret is generated by re-keying within the session.

For standards-based implementations of TLS/SSL, APIs and open source packages are widely available so that the master secret can be programmatically accessed by developers during the process of debugging so that these secrets may be used to decrypt on-wire communications using commercial packet capture utilities such as Wireshark.

In the case where developers utilize generally available OS secure transport functions for networking, such as Apple Secure Transport, Apple UI Web View and SF Safari View Controller, the OS itself has clear access to the master secret for such networking sessions.

Initiating the Access Enablement Process

The access enablement process step of one embodiment will now be described in more detail. Depending upon the application, the initiation process might vary in degree of difficulty for the developer. Some developers utilize non-OS secure transport libraries (such as OpenSSL), or may build their own custom IP-based protocols of their own design. In these cases, even though developers may have ready access to their own form of master secret, they may for valid engineering reasons find it to be a material burden to alter their application's protocols and data formats to support enablement for legally authorized exceptional access.

In one example, the vendor's OS can provide a simple function such as this, where an IP-address-list is a list of IP addresses of the other party or parties involved in the secure communications. This would be performed either or both as the party initiating or receiving an inbound connection request for a given communications session. Functionally, this might be described as follows:

OS.EnableForAuthorizedAccess(IP-address-list, Master Secret)

As will be seen in distributing the access packages step below, if the application adds this call at the appropriate place, the OS vendor's services will take care of getting a highly protected form of the master secret distributed in a way that the government agency can access it if they are monitoring communications to/from any of those IP addresses.

However, if the developer's application happens to be utilizing a generally available OS secure transport function for networking, including such common things as HTTPS:// web requests, the developer need not do anything to Initiate an access enablement process because the OS has everything it needs to do it without developer involvement. The OS knows the master secret, and it knows the IP addresses.

Finally, in one embodiment, if an application developer has a messaging application where they have the ability to modify and extend the message envelope metadata, or if the developer has a real-time communications application where they have the ability to modify and extend the session initiation protocol metadata, they might wish to embed the data that enables authorized access directly within their message or session. They would do this by using a service that might be functionally described as:

OS.EnableForAuthorizedAccess(Master Secret)→EA Distribution Pkg

If the developer includes that returned data within the header of their message or session, in the clear, the application will have been enabled for authorized access because the government will have had access to these fields directly within the data that they had collected and recorded.

Encrypting the Master Secret for Later Use

As discussed above, the first step in access enablement is that of securely encrypting the master secret. Mechanisms described earlier may be utilized to ensure that the TKT is created and up-to-date as of the current time and date. This means that the very first entry in the table has a date/time range which is inclusive of the now-current date/time. In this step, the key in the first entry of the TKT is used to encrypt and thus key wrap the master secret for the Initiated session, resulting in a package that might later be used to obtain the master secret. Functionally, this first step might be described as:

App.Maintain(TKT, Minimization Policy)
App.GetCurrentTKTEntry( )→Current Range, Current Key
App.Encrypt(Master Secret, Current Key)→Encrypted Master Secret
App.Marshal(Current Range, Encrypted Master Secret)→ EA Decryption Pkg Encrypting the TKT for Later Use The Next Step in Access Enablement is to Create a Data Package that can be Used by the Vendor to comply with a legally-authorized warrant. This data package may be decipherable by the vendor.

Device vendors verify the authenticity and protect the integrity of system software updates for their devices so as to prevent modification by malware. This lock-down is generally accomplished by a technique called code signing, wherein cryptographic mechanisms including public key cryptography are used to attach digital signatures to vendor-authorized packages of code and other digital resources. A chain of trust is established by using digital signature verification using a vendor's root CA public key and/or other vendor public keys generally contained in the device's read-only memory, or which may be securely stored within a tamper-resistant hardware security module, referred to as a secure enclave or trust zone.

A vendor creating, maintaining, and using the private portion of the cryptographic key pair, the vendor private keys, must do so with great care, for carelessness that might for example cause disclosure of a private key, or misuse of the private key, would cause a fundamental breakdown of trust. So critical is this trust that vendor private keys are generally stored and maintained exclusively within one or more enterprise-grade hardware security modules (HSMs) at their facilities. Vendors generally maintain strict internal processes and practices so that only their trusted developers and trusted software release engineers are authorized to generate and attach digital signatures to software, firmware, and other digital resources, which ensures the integrity and provenance of all digital assets signed, encrypted, and decrypted with the Vendor Keys.

In one embodiment of the method herein, a copy of the TKT itself is encrypted for exclusive access by the vendor by using their vendor public key. This might be the vendor public key the vendor utilizes for code signing, or alternatively might be a vendor public key that is maintained by the vendor in parallel to their code signing key explicitly for this purpose.

This encrypted copy of the TKT, and ultimately the request package or exceptional access ("EA") request package that will be used by the vendor to satisfy a legally-authorized warrant from the government, could be described functionally as follows:

App.Encrypt(TKT, Vendor Public Key)→EA Request Pkg

For efficiency reasons related to the relative performance of symmetric and asymmetric encryption algorithms, it may be created by a procedure that is functionally described as follows:

App.NewRandomSymmetricKey( )→Key
 App.Encrypt(TKT, Key)→Encrypted TKT
 App.Encrypt(Key, Vendor Public Key) Vendor-Encrypted Key
 App.Marshal(Vendor-Encrypted Key, Encrypted TKT)→ EA Request Pkg Creating and Distributing a Distribution Package Herein, the combination of the EA Request Package and the EA Decryption Package is referred to as an EA Distribution Package ("EPKG"), the two pieces being brought together for transmission and potentially for later interception. This distribution package has everything within it that is required to be in possession of the government in order for them to perform a legally authorized exceptional access. Functionally, this combination would be described as follows:

App.Marshal(EA Request Package, EA Decryption Package)→EA Distribution Package

Certain developers may feel it best to modify their product's messaging envelope or communications protocol metadata to contain such an EA distribution package by using, for example, an OS service designed to provide this package to the application. In other cases, however, the OS may take on the responsibility for delivering the EA distribution package in a way that with high likelihood will be collected by the government as a side-effect of legally intercepting and recording encrypted communications. Functionally, distributing the EA distribution package would be described as follows:

App.Transmit(EA Distribution Pkg)

There may be a plurality of ways that this might be accomplished, the most common of which are described as follows. In one embodiment, the EA distribution package might be transmitted by the device in the clear, addressed to the other IP endpoint(s), on a "sideband" that is statistically likely to follow the same path as the communications itself. For example, if device A were conducting a TLS-secured IP communications session with a server or peer device whose IP address were B, device A might transmit the EA distribution package in a single UDP packet addressed to B. In one embodiment, the target endpoint B's software need not even be listening for such a transmission, because the only purpose of transmitting the EA distribution package is for it to be available for authorized recording on the network. In one embodiment shown in FIG. 6A, an example of a same path to destination method is shown where an EPKG is transmitted over UDP on port N assigned by IANA for EA use by all vendors.

In another embodiment, the EPKG might be transmitted, along with session or message identification, to a separate destination such as vendor-controlled server which could itself take the responsibility for retransmission of EA Distribution Packages to law enforcement agencies. A vendor relay method is shown in FIG. 6B, where the EPKG is transmitted over UDP on port N to the IP address EA.vendor.com.

Recovering Unencrypted Communications

Certain embodiments for the process of recovering unencrypted communications from a collected recording of encrypted communications will now be described. For the case of an enterprise, it will have recorded both the encrypted communications sessions occurring on its own devices, as well as the clear text TKT data structures as they were being maintained across those devices. As such, the decryption of recorded communications is straightforward, and may be functionally described as follows:

Enterprise.Intercept( )→EA Distribution Pkg, Encrypted Session Data
 Enterprise.Unmarshal(EA Distribution Pkg)→EA Decryption Pkg
 Enterprise.Unmarshal(EA Decryption Pkg)→Date Range, Encrypted Master Secret
 Enterprise. FindTKTEntryInArchive(Date Range)→Key
 Enterprise.Decrypt(Encrypted Master Secret, Key)→ Master Secret
 Enterprise.Decrypt(Encrypted Session Data, Master Secret)→Session Data For a government agency who might intercept the same EA distribution package and encrypted session data, however, a second party, such as the vendor, must be involved if the session is to be decrypted. Large-scale mainstream device and application vendors have processes and practices within which both domestic and foreign governments issue formal requests to vendors for assistance and these well-resourced vendors may challenge such requests.

These processes, only realistically available to extremely large commercial vendors and developers, are arguably a strong benefit to society, providing legal checks and balances that can potentially afford citizens the visibility to the pros and cons of exceptional access that might influence their own attitude, and their choice of representation in government, at any point in time.

The government would begin its process by intercepting and extracting certain information from a single EA distribution package as the warrant period is beginning. Functionally, what they may do is described as follows:

Govt.Intercept( )→EA Distribution Pkg, Encrypted Session Data
 Govt.Unmarshal(EA Distribution Pkg)→EA Request Pkg, EA Decryption Pkg In one embodiment, the government may continue its request for legally-authorized exceptional access by creating and submitting a request for vendor assistance, according to government/vendor submission practices. As part of this request, the government may submit the precise starting date and duration of the legal order defining the legal constraints of the allowed exceptional access, as well as a data file, printout, or message containing the data of the EA request package. Functionally, this may be described as:

Govt.ConveyToVendor(Warrant, EA Request Pkg)

Receiving the request as a part of its normal processes and practices, the vendor's lawyers would use due care to scrutinize the request for its validity, provenance, jurisdiction, and other factors. Once the vendor's management and lawyers have gotten past the point of any potential challenges that may exist, the vendor may use their enterprise HSM to decrypt what is contained within the request package, functionally described as follows:

Vendor.Unmarshal(EA Request Pkg)→Vendor-Encrypted Key, Encrypted TKT

Vendor.HSM.Decrypt(Vendor-Encrypted Key, Vendor Private Key)→Key

Vendor.Decrypt(Encrypted TKT, Key)→TKT

Once decrypted, the vendor may use a function similar to the Filter (TKT) described above, to filter the TKT down to only those dates authorized in the warrant. This filtered result is referred to herein as the warranted TKT. If any entry in the TKT does not include any of the dates authorized in the order that entry will not appear in the warranted TKT. The vendor will then return the warranted TKT to the requesting government agency. This procedure may be functionally described as follows:

Vendor.Minimize(Warrant, Minimization Policy, TKT)→Warranted TKT

Vendor. ConveyToGovt(Warranted TKT)

The government can then use the warranted TKT entry to decrypt the master secret within the EA decryption package already in their possession, thus by extension enabling decryption of the communications. The process may be functionally described as follows:

Govt.Intercept( )→EA Distribution Pkg, Encrypted Session Data

Govt.Unmarshal(EA Distribution Pkg)→EA Request Pkg, EA Decryption Pkg

Govt.Unmarshal(EA Decryption Pkg)→Session Range, Encrypted Session Key

Govt.FindFirstIntersection(Session Range, WarrantedTKT.Range)→i

Govt.Decrypt(Encrypted Session Key, WarrantedTKT[i].Key)→Master Secret

Govt.Decrypt(Encrypted Session Data, Master Secret)→Session Data

From the government's perspective, the warranted TKT is useful in that it may be used as many times as necessary to decrypt future communications that occur within the date/time range intersection of a) the submitted TKT's minimization policy, and b) the legally-authorized order. For example, with a certain minimization policy the government might be able to do a single transaction with the vendor in order to receive warranted TKT that would enable access to communications several weeks or months into the future.

From the vendor's perspective, this method gives the vendor some control to ensure not just their involvement, but their ability to apply a filter to limit the scope of decryption to approximately that which is legally authorized and thus legally requested. By crafting the policy for creation and maintenance of the TKT, the vendor can self-block its own ability to satisfy indefinitely-scoped requests, thus ensuring that the vendor will have a periodic opportunity to evaluate and potentially challenge requests on behalf of their customers.

Another benefit for all parties, which may include the vendor, the government, and the customer, is that in this method the vendor is never in possession of either the customer's data or the master secrets that might yield access to the customer's data. Vendors are only in the position of being a check and balance to the process of legally-authorized exceptional access to their customers' communications.

All of this is enabled by the power of strong encryption, and with risk being low due to the fact that the only exceptional access keys and mechanisms are those that are already trusted and deployed for or run in parallel with, or analogous to, code signing.

Figure 7:
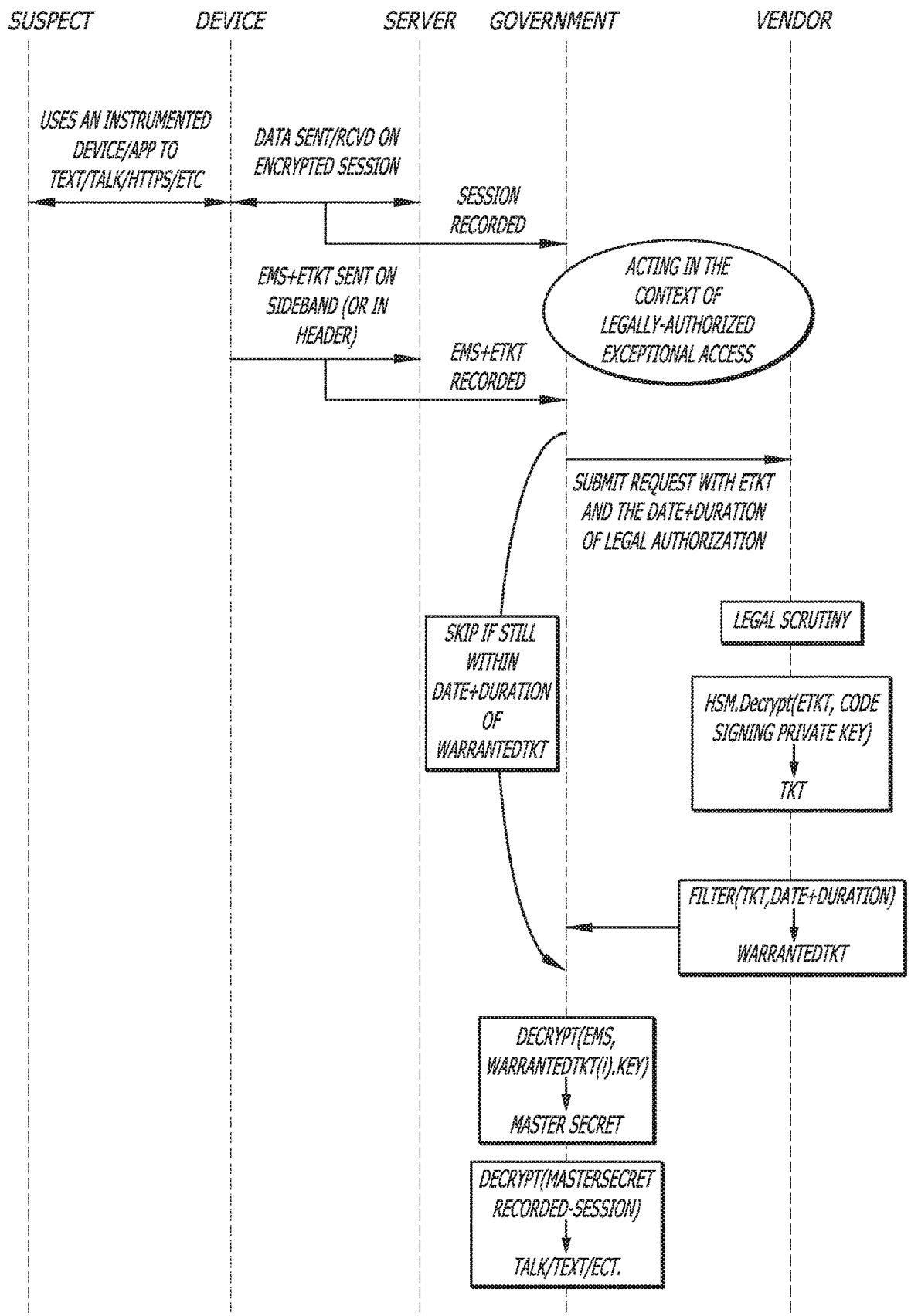
FIG. 7 depicts a diagram of an exemplary method for gaining access to real-time communications sent or received by a device.

A diagram illustrating the method for accessing real-time communications of a device is shown in FIG. 7. In this diagram, EA distribution package contents are represented as ETKT (the encrypted TKT) and EMS (the encrypted master secret). By way of example, a government agency may receive a warrant to intercept communications made on a suspect's device, such as a mobile phone, tablet or other computer device. A suspect may use an instrumented device or application on the device to text, talk, or using any protocol to send secure communications, including HTTPS. As used herein, an application may be where EA is enabled, regardless of whether EA code is in the OS, used by OS-supplied communication applications, in the developer's application itself, or in the OS, used by other developers calling a platform API (for example, inside an extended CFNetwork and Secure Transport API, and by extension UIWebView, WKWebView, and Safari View Controller).

Access to Secure Messaging

In contrast to applications that utilize master secrets whose duration is a long-lived real-time session, some messaging applications utilize protocols wherein the symmetric key encrypting the clear text changes very frequently. In order to distinguish them from long-lived master secrets, these fast-changing symmetric encryption keys are referred to herein as message keys. In some secure messaging protocols, unique message keys may be generated for each individual message, or a message key may be generated for groups of messages. Examples of such protocols include the Signal Protocol, Off-the-Record Messaging protocol, and Silent Circle Instant Messaging Protocol.

A method for exceptional access to real-time communications has been described above. The method involves generating an EA distribution packet every time a new master secret is generated and used. When considering exceptional access to protocols such as these in which we have an analogous key (the message key) that changes very frequently, it would be possible although quite impractical to transmit an EA distribution packet for every such message key generated in real-time. Furthermore, because many of these protocols are fully asynchronous and support offline use, in some cases it would be impossible to transmit an EA distribution packet at the time the message key was generated.

To cover this case, one embodiment of a protocol for exceptional access to live communications includes an encryption key access mechanism specifically designed for online/offline secure messaging that shares many of the mechanisms used in the real-time communication method described above. By sharing technical methods and processes, the vendor/government access processes, practices, and work flows may be identical or similar to those described above. Herein the technical mechanisms for managing Timed Key Tables (TKT), and for generating and distributing EA distribution packages, may be identical or substantially similar and shared.

In one method for gaining access to secure messaging, just as in the real-time communications method, the vendor maintains a TKT based on their minimization policy for exceptional access.

When the application is opened and it happens to be online, on a reasonable periodic basis (for example, at most once daily), the application ensures that the TKT is transmitted in a way that is accessible to the government agency or agent. This period may be chosen as another component of the vendor's minimization policy. Because it can be economically advantageous to use the same tools and processes across exceptional access methods, the method from the real-time communications method is utilized to maintain and transmit EA information, functionally described as follows. Note that this function is similar to the method described above, but with no master secret needed.

App. TransmitEAPackage( )

Then, whether online or offline, for each message with a message key that would be encrypted during this period, an additional field is added to that message's metadata that the communications application will then transmit in clear text, and thus which could be intercepted in clear text:

App.GetCurrentKeyInfo( )→Current Range, Current Key
App.Encrypt(Message Key, Current Key)→Encrypted Message Key
App.Marshal(Current Range, Encrypted Message Key)→ Message Decryption Pkg
Message.EAMDP=Message Decryption Pkg When the government agency has a warrant, the same government/vendor processes are used as were used with real-time communication method, yielding the warranted TKT.

Figure 8:
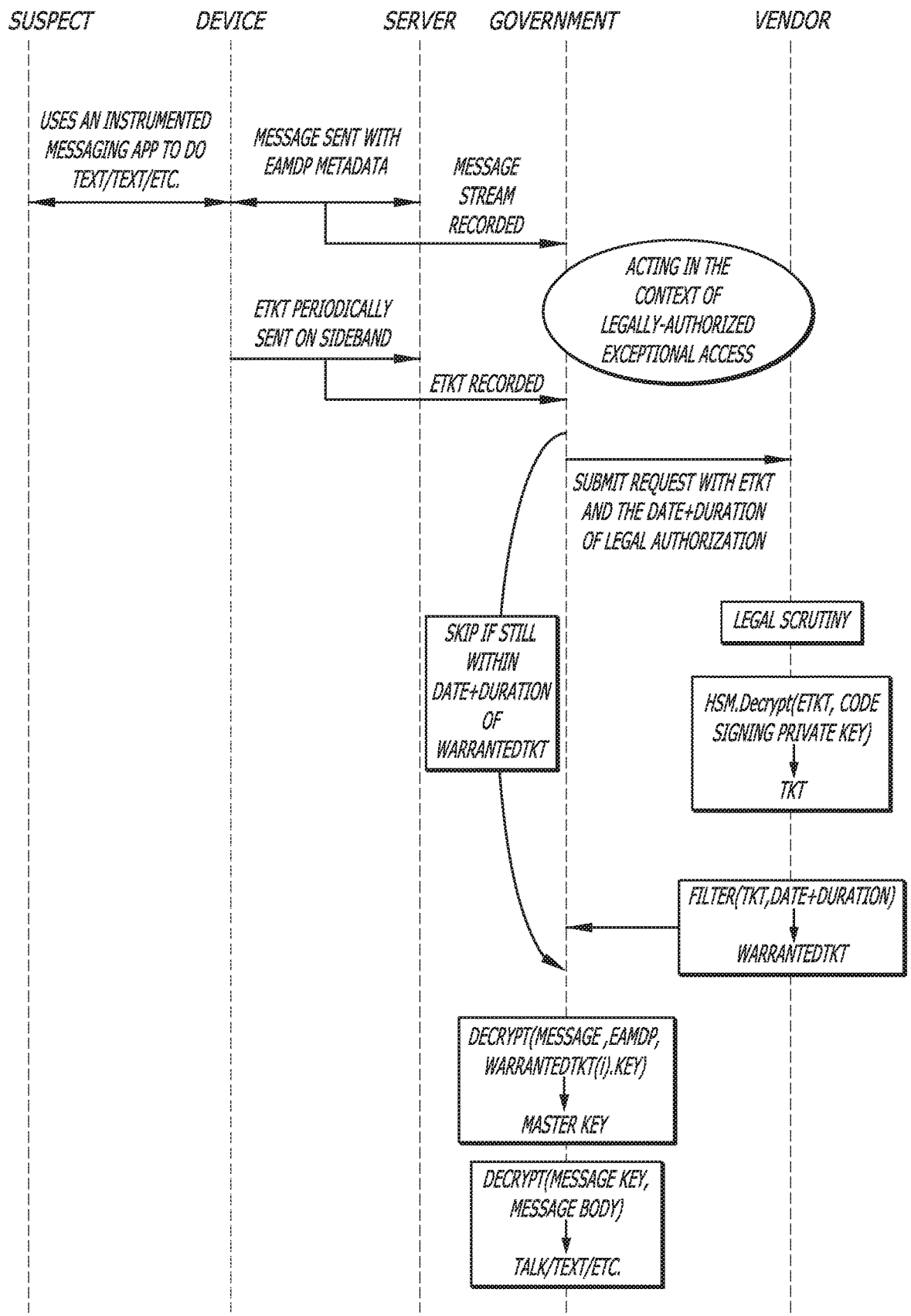
FIG. 8 depicts a diagram of an exemplary method for gaining exceptional access to secure messaging sent or received by a device.

Then, for each message to be decrypted within the warrant period, the government agency executes the following:

Govt.Intercept(Message.EAMDP)→Message Decryption Package, Encrypted Message
Govt.Unmarshal(Message Decryption Package)→Message Range, Encrypted Message Key
Govt.FindFirstRangeIntersection(Message Range, WarrantedTKT.Range)→i
Govt.Decrypt(Encrypted Message Key, WarrantedTKT [i].Key)→Message Key
Govt.Decrypt(Encrypted Message, Message Key)→Message A diagram illustrating one embodiment of a method for exceptional access to secure messaging is shown in FIG. 8. By way of example, a government agency may receive a warrant to intercept communications made on a suspect's device, such as a mobile phone, tablet or other computer device. A suspect may use a secure messaging application on an instrumented device to text, talk, send photos, or any other similar activity.

When the suspect uses the device for communicating, although the messaging application will encrypt its data, the exceptional access message distribution package (EAMDP) metadata will be transmitted in the clear for each message. The EA Distribution Package, which includes everything necessary to potentially gain exceptional access to secure messaging including the encrypted TKT (ETKT), and is periodically sent on a sideband to the server. When legally authorized to do so, the government agency may record the communication data and the EA distribution package.

After recording the messaging data and the EA distribution package, the government agency submits a request to the vender of the device as shown in FIG. 8. As in the process flow in exceptional access for real-time communications, the request may include the EA request package and the date and duration of legal authorization to record the real-time communications of the suspect. The vendor may then scrutinize the request and then decrypt the ETKT using the private key contained within their enterprise HSM. The vendor may then filter the decrypted timed key table (TKT) along with the date and duration of the legal authorization to create a TKT subset referred to as the warranted TKT that is then sent to the government agency. As shown in FIG. 8, the government agency is able to decrypt the EAMDP using that warranted TKT key to generate a message key. Using the message key, the government agency is able to decrypt the recorded communication session of the suspect. If the recorded session is within the date and duration of the warranted TKT, the government agency can continue to use that TKT subset to decrypt future messages.

Defense in Depth

In another embodiment, there is disclosed a system and method to defend against future technical advancements that, if they were to occur, might enable a third party to access the unencrypted form of recorded communication, including those communications sent or received by a mobile device. By way of background only, a third party may be motivated to legally or illegally tap and record any communication over a network. Although the methods described herein will prevent disclosure of encrypted data to such an unauthorized third party, over time certain advances in cryptanalytics, including weaknesses discovered in cryptographic algorithms or random number generator implementations, might render encrypted communications vulnerable. By providing a system and method to defend against these future technical advancements, such vulnerabilities can be minimized or eliminated.

In one embodiment, a method to defend against a third party from leveraging cryptanalytic advances to decrypt communications may include the use of redundancies. For example, rather than use a single symmetric algorithm in an embodiment, one may instead combine two or more symmetric algorithms/parameters (e.g., AES & Blowfish) in a redundant manner. Rather than use a single unique pseudo-random number generator (PRNG) in an embodiment, one may instead combine two or more PRNG algorithms (e.g., Mersenne Twister & Yarrow). Rather than use a single asymmetric algorithm, one may instead combine two or more asymmetric algorithms (e.g., DH & RSA). Rather than use a single vendor of enterprise HSM, one may instead combine two or more enterprise HSMs, e.g., Safenet & Thales. By combining diverse components in a redundant manner, a newfound vulnerability discovered in any one of the above should mean that any encrypted data is still fully protected by that redundancy and diversity.

In certain embodiments, the method for an enhanced defense against unauthorized access to encrypted communications may include the following symmetric key operations. For example, the App.NewRandomKey( ) described earlier may instead be implemented as:

Marshal(Alg1.Keygen(RNG1), Alg2.Keygen(RNG2))→Key

Furthermore, App.Encrypt(Data, Key) may be implemented as:

Unmarshal(Key)→Key 1, Key2
Alg2.Encrypt(Alg1.Encrypt(Data, Key1), Key2)→Encrypted Data In addition, App.Dencrypt(Data, Key) may be implemented as:

Unmarshal(Key) Key1, Key2
Alg1.Decrypt(Alg2.Decrypt(Data, Key2), Key1)→Decrypted Data By way of example, the enhanced method for defending against unauthorized access to encrypted communications may include the following asymmetric key operations. For example, Vendor.NewPublicKey( ) may be implemented as:

Marshal(HSM1.Keygen(Alg1).PubKey1, HSM2.Keygen(Alg2).PubKey2) VendorPubKey

Also, App.Encrypt(Data, VendorPubKey) may be implemented as:

Unmarshal(PubKey)→PubKey1, PubKey2
Alg2.Encrypt(Alg1.Encrypt(Data, PubKey1), PubKey2)→Encrypted Data Furthermore, Vendor.HSM.Decrypt(EncryptedData) may be implemented as:

HSM2.Decrypt(HSM1.Decrypt(EncryptedData))→Data

One of ordinary skill in the art will appreciate that not all methods and systems have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method for providing access to a third party to a locked communication device, comprising:
    generating a data access key, wherein the data access key contains encrypted information relating to a data protection key;
    storing the data access key within memory associated with the locked communication device;
    reformatting the data access key into a first transportable format comprising a barcode;
    transporting the data access key to a vendor, wherein the data access key is decrypted with a private key;
    receiving the data protection key back from the vendor in a second transportable format comprising a barcode; and
    unlocking, by the third party, the locked communication device with the data protection key.

2. The method of claim 1, wherein the data access key is generated by wrapping a data protection key of the locked communication device.

3. The method of claim 2, wherein a public key is used to encrypt and wrap the data protection key of the locked communication device to generate the data access key.

4. The method of claim 2, wherein a unique encryption key is used to wrap the data protection key of the locked communication device to generate an encrypted data protection key.

5. The method of claim 4, further comprising wrapping the encrypted data protection key using a public key to generate the data access key.

6. The method of claim 1, wherein the first transportable format further comprises a number string or a text string.

7. The method of claim 1, wherein the vendor of the locked communication device recovers the data protection key by decrypting the data access key at the enterprise hardware security module of the vendor which contains a private key used in the decryption.

8. The method of claim 1, wherein receiving the second transportable format further comprises a number string or a text string.

9. The method of claim 1, further comprising decoding and extracting the data protection key from the second transportable format using the locked communication device.

10. The method of claim 1, further comprising extracting the data protection key from the transportable format.

11. The method of claim 1, further comprising freezing data of the unlocked communication device.

12. The method of claim 1, wherein the barcode comprises a two-dimensional barcode.

13. The method of claim 1, wherein the first transportable format further comprises an image.

14. The method of claim 1, wherein the second transportable format further comprises an image.

15. The method of claim 1, wherein the first transportable format further comprises an audible transportable format.

16. The method of claim 15, wherein the audible transportable format comprises an audio file.

17. The method of claim 15, wherein the audible transportable format comprises a sound.

18. The method of claim 1, wherein the second transportable format further comprises an audible transportable format.

19. The method of claim 18, wherein the audible transportable format comprises an audio file.

20. The method of claim 18, wherein the audible transportable format comprises a sound.

* * * * *